(12) United States Patent
Raphaeli et al.

(10) Patent No.: US 7,020,784 B2
(45) Date of Patent: Mar. 28, 2006

(54) MECHANISM FOR DETECTING INTRUSION AND JAMMING ATTEMPTS IN A SHARED MEDIA BASED COMMUNICATIONS NETWORK

(75) Inventors: Dan Raphaeli, Kfar Saba (IL); Evgeny Bassin, Beer Sheva (IL); Mordechai Mushkin, Nirit (IL); Oren Kaufman, Beer Sheva (IL); Tanya Rosing, Beer Sheva (IL)

(73) Assignee: Yitran Communications Ltd., Beer Sheva (IL)

( * ) Notice: Subject to any disclaimer, the term of this patent is extended or adjusted under 35 U.S.C. 154(b) by 879 days.

(21) Appl. No.: 09/933,060

(22) Filed: Aug. 20, 2001

(65) Prior Publication Data

US 2004/0103307 A1  May 27, 2004

(51) Int. Cl.
*H04L 9/00* (2006.01)
(52) U.S. Cl. ...................... 713/201; 370/230
(58) Field of Classification Search ................ 713/201, 713/200, 153; 370/230
See application file for complete search history.

(56) References Cited

U.S. PATENT DOCUMENTS

| | | | |
|---|---|---|---|
| 4,179,657 A | 12/1979 | Hobbs | 325/33 |
| 5,036,518 A | 7/1991 | Tseung | 371/32 |
| 5,109,384 A | 4/1992 | Tseung | 371/32 |
| 5,557,798 A * | 9/1996 | Skeen et al. | 705/35 |
| 5,568,476 A * | 10/1996 | Sherer et al. | 370/236 |
| 5,884,040 A | 3/1999 | Chung | 395/200 |
| 5,892,903 A | 4/1999 | Klaus | 395/187.01 |
| 5,958,053 A | 9/1999 | Denker | 713/201 |
| 6,151,679 A | 11/2000 | Friedman et al. | 713/201 |
| 6,772,334 B1 * | 8/2004 | Glawitsch | 713/153 |
| 6,785,823 B1 * | 8/2004 | Abrol et al. | 713/201 |

* cited by examiner

*Primary Examiner*—Gregory Morse
*Assistant Examiner*—Andrew L Nalven
(74) *Attorney, Agent, or Firm*—Zaretsky & Associates; Howard Zaretsky

(57) ABSTRACT

A novel and useful mechanism for detecting intrusion and jamming attempts by an imposter node. A time window defined as an emergency window is reserved after the end of a packet and before an acknowledgement window. Nodes that detect the presence of an intruder transmit an emergency packet during the emergency time window to inform the receive node that the packet it received was sent from an imposter node. Attempts to jam the transmission of the emergency packet from the victim node to the receive node are detected by listening during the emergency window time period for carrier signal that indicates that an emergency packet is trying to be sent. An emergency packet request message is sent by the receive node in response which causes the victim node to resend the emergency packet.

47 Claims, 9 Drawing Sheets

MECHANISM FOR DETECTING INTRUSION AND JAMMING ATTEMPTS IN A SHARED MEDIA BASED COMMUNICATIONS NETWORK

FIELD OF THE INVENTION

The present invention relates generally to data communication systems and more particularly relates to a mechanism for detecting intrusion and jamming attempts by an imposter node in a shared media based communications network.

BACKGROUND OF THE INVENTION

A problem that can potentially plague shared media type networks is the possibility that an intruder may attempt to enter the network by using the addresses of active nodes in the network. The imposter node attempts to communicate with one or more target nodes by pretending to be an active node on the network. If the imposter node remains undetected, network security is compromised with the result being possible malicious attacks on the network such as causing one or more nodes to execute commands generated by the imposter. The integrity of the network may be compromised with the possible loss of data, breach of security, disruption of network traffic and the loss of communications between nodes. Further, an intruder node may attempt to interfere with network communications by jamming other nodes and preventing them from communicating over the network. The intruder may have knowledge of the protocol in use and is thus able to effectively jam communications by transmitting noise or other signals at the appropriate point(s) in time.

A diagram illustrating an example network comprising an imposter, victim and receiver/destination node is shown in FIG. 1. In this example network, generally referenced 10, a plurality of nodes is adapted to communicate over the shared media 12. An imposter node 14 fakes the address of a victim node 16 and sends packets to the receiver/destination node 18 with the source address of the victim node. Without any intruder detection capability, the receiver receives, decodes and processes the packet believing the packet was sent from the victim when in reality it contains commands from the imposter.

Even if the victim node has the capability of detecting the intruder, it might not be able to communicate the presence of the intruder to the receiver node if the imposter node has the capability of jamming the receiver node. The imposter node may have knowledge of the MAC protocol and can effectively jam the receiver preventing the victim node from notifying the receiver node.

There is thus a need for a shared media based communications network to be able to detect attempts by an intruder to enter into the network. Further, the network should be able to detect when an imposter is attempting to jam one or more other nodes.

SUMMARY OF THE INVENTION

Accordingly, the present invention provides a novel and useful mechanism for detecting intrusion and jamming attempts by an imposter node. The mechanism of the present invention is particularly useful in communication systems characterized by shared media such as networks that use power line carrier communications. In general, the invention is applicable where a plurality of stations are connected to a shared communication media whereby an imposter node is able to intrude into the network by using the address of a valid active node.

An improved mechanism for detecting intrusion and jamming attempts in a network is provided whereby a time window defined as an emergency window is reserved after the end of a packet and before an acknowledgement window. Nodes that detect the presence of an intruder transmit a special packet referred to as an emergency packet during the emergency time window.

The function of the emergency packet is to inform the receive or destination node that the packet it just received was sent from an imposter node. The victim node detects the presence of an imposter by receiving a packet containing its own source address.

The mechanism provides for the case where the imposter node attempts to jam the transmission of the emergency packet from the victim node to the receive node. The receive node listens during the emergency window time period and if it detects carrier signal during this time is assumes that a victim node in the network is trying to send an emergency packet. In response, the receive node transmits an emergency packet request message to indicate that it did not successfully receive the emergency packet.

The victim node receives the emergency packet request message and in response resends the emergency packet. This process may be repeated any number of times until the emergency packet is successfully received by the receive node or a predefined number of time whereupon the receive node eventually assumes that it is being jammed and that the presence of an imposter node is suspected. The imposter message is transferred to the host but with a flag indicating that the packet came from a suspected imposter node.

The mechanism also handles the case where the victim node is also the receive node. In this case, the source and destination addresses of the imposter packet match that of the victim node. In this case, no emergency packet is sent and the host is immediately informed of the suspected presence of an imposter node.

Many aspects of the previously described invention may be constructed as software objects that execute in embedded devices as firmware, software objects that execute as part of a software application on a computer system running an operating system such as Windows, UNIX, LINUX, etc., an Application Specific Integrated Circuit (ASIC) or functionally equivalent discrete hardware components.

There is therefore provided in accordance with the present invention a method of detecting intrusion attempts by an imposter in a communications network, the method comprising the steps of at a victim node, determining that a received packet comprises an address corresponding to the victim node; and in response thereto, transmitting an emergency packet, at a destination node, receiving the emergency packet and, in response thereto, generating an intrusion attempt indication, at a destination node, detecting a carrier signal not followed by receipt of the emergency packet, and in response thereto transmitting an emergency packet request and at the victim node, resending the emergency packet in response to receipt of the emergency packet request.

There is also provided in accordance with the present invention a method for use in a victim node of detecting intrusion attempts by an imposter in a communications network, the method comprising the steps of determining that a received packet comprises an address corresponding to the victim node; and in response thereto, transmitting to a destination node an emergency packet and resending the emergency packet in response to receipt of an emergency packet request transmitted from the destination node.

There is further provided in accordance with the present invention a method for use in a destination node of detecting intrusion attempts by an imposter in a communications network, the method comprising the steps of receiving a received packet transmitted over the communications network, listening during an emergency window for the presence of carrier signal, if carrier signal is detected during the emergency window and an emergency packet is received subsequent thereto, generating an intrusion attempt indication and if carrier signal is detected during the emergency window and no emergency packet is received subsequent thereto, transmitting an emergency packet request and repeating the step of listening.

There is also provided in accordance with the present invention an Application Specific Integrated Circuit (ASIC) for use in a node for detecting intrusion attempts by an imposter in a communications network, the ASIC comprising means for determining that a received packet comprises an address corresponding to the node, means for transmitting an emergency packet following the end of the received packet if the node determines the received packet comprises the address of itself, means for receiving the emergency packet and generating an intrusion attempt indication, in response thereto, means for detecting a carrier signal without subsequent receipt of the emergency packet and transmitting an emergency packet request, in response thereto and means for resending the emergency packet in response to receipt of the emergency packet request.

There is still further provided in accordance with the present invention a communications station for transmitting and receiving signals to and from other stations connected over a shared communications media based network comprising a coupling circuit for generating a receive signal received over the network and for outputting a transmit signal onto the network, a transmitter adapted to modulate a synchronization sequence and data to be transmitted in accordance with a modulation scheme so as to generate the transmit signal therefrom, the synchronization sequence comprising a plurality of symbols wherein each symbol is separated by a time delay in accordance with a predetermined synchronization sequence time delay template, a receiver adapted to demodulate the receive signal in accordance with the modulation scheme so as to generate a receive data signal therefrom, a media access control (MAC) circuit adapted to interface an application processor to the shared communications media, the MAC circuit comprising means for determining that a received packet comprises an address corresponding to the node, means for transmitting an emergency packet following the end of the received packet if the node determines the received packet comprises the address of itself, means for receiving the emergency packet and generating an intrusion attempt indication, in response thereto, means for detecting a carrier signal without subsequent receipt of the emergency packet and transmitting an emergency packet request, in response thereto, means for resending the emergency packet in response to receipt of the emergency packet request and the application processor adapted to control the operation of the transmitter, receiver and MAC and to provide an interface between the MAC and an external host.

There is also provided in accordance with the present invention a computer program product for use in communications station, the computer program product comprising a computer useable medium having computer readable program code means embodied in the medium for detecting intrusion attempts by an imposter in a communications network, the computer program product comprising computer readable program code means for determining that a received packet comprises an address corresponding to the node, computer readable program code means for transmitting an emergency packet following the end of the received packet if the node determines the received packet comprises the address of itself, computer readable program code means for receiving the emergency packet and generating an intrusion attempt indication, in response thereto, computer readable program code means for detecting a carrier signal without subsequent receipt of the emergency packet and transmitting an emergency packet request, in response thereto and computer readable program code means for resending the emergency packet in response to receipt of the emergency packet request.

BRIEF DESCRIPTION OF THE DRAWINGS

The invention is herein described, by way of example only, with reference to the accompanying drawings, wherein.

DETAILED DESCRIPTION OF THE INVENTION

Figure 1:
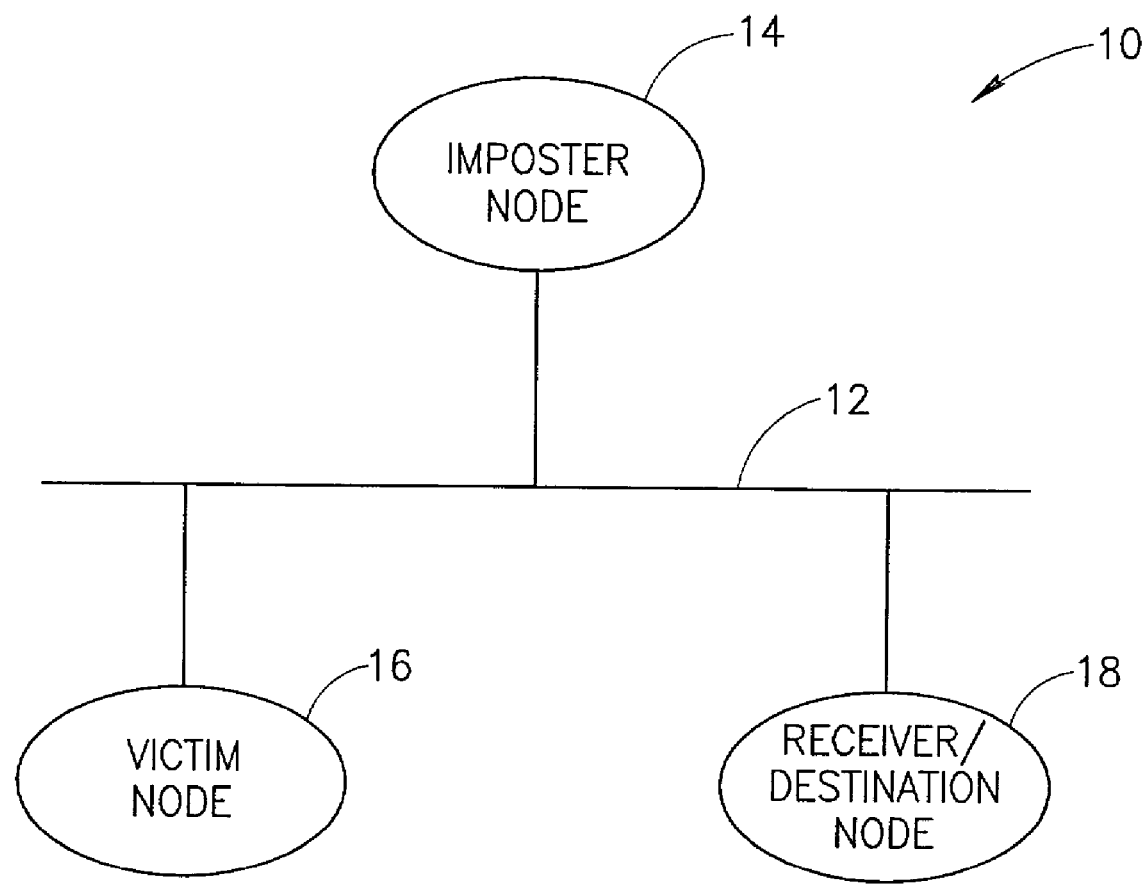
FIG. 1 is a diagram illustrating an example network comprising an imposter, victim and receiver/destination node.

| Term | Definition |
|---|---|
| AC | Alternating Current |
| ASIC | Application Specific Integrated Circuit |
| CPU | Central Processing Unit |
| CSK | Code Shift Keying |
| CSMA | Carrier Sense Multiple Access |
| DAT | Digital Audio Tape |
| DCSK | Differential Code Shift Keying |
| DLL | Data Link Layer |
| DSP | Digital Signal Processor |
| DVD | Digital Versatile Disk |
| EEPROM | Electrically Erasable Programmable Read Only Memory |
| EEROM | Electrically Erasable Read Only Memory |
| EPR | Emergency Packet Request |
| EPROM | Electrically Programmable Read Only Memory |
| FPGA | Field Programmable Gate Array |
| IR | Infrared |

-continued

| Term | Definition |
|---|---|
| LAN | Local Area Network |
| MAC | Media Access Control |
| NIC | Network Interface Card |
| OSI | Open Systems Interconnect |
| PBX | Private Branch Exchange |
| PC | Personal Computer |
| PDA | Personal Digital Assistant |
| PLC | Power Line Carrier |
| RAM | Random Access Memory |
| RF | Radio Frequency |
| ROM | Read Only Memory |
| UST | Unit Symbol Time |
| WAN | Wide Area Network |

The present invention is a novel and useful mechanism for detecting intrusion and jamming attempts by an imposter node. The mechanism of the present invention is particularly useful in communication systems characterized by shared media such as networks that use power line carrier communications. In general, the invention is applicable where a plurality of stations are connected to a shared communication media whereby an imposter node is able to intrude into the network by using the address of a valid active node.

For purposes of this specification, the term 'station,' 'node' or 'communication node' shall be taken to mean any network entity, implemented in either hardware, software or a combination of hardware and software, which may be the endpoint of a call, link or connection within a shared media based network. The network may comprise any type of shared network or media including but not limited to power line carrier based networks, twisted pair networks, IR wireless networks, RF wireless networks, optical fiber ring networks, etc. The term 'call,' 'link' or 'connection' shall be taken to mean any communication path that is established between at least two nodes for the purpose of communication therebetween.

The intruder and jamming detection mechanism of the present invention is especially suited for use in carrier sense multiple access (CSMA) type data communication systems. Examples of such systems include spread spectrum systems that use the Differential Code Shift Keying (DCSK) or non-differential Code Shift Keying (CSK) modulation techniques. Such communications systems are applicable to relatively noisy environments such as the AC power line.

In a CSK transmission system, the data is transmitted in the form of time shifts between consecutive circularly rotated waveforms of length T which are referred to as spreading waveforms, i.e., spread spectrum correlator sequence waveforms. The spreading waveforms can comprise any type of waveform that has suitable auto correlation properties. During each symbol period, referred to as a unit symbol time (UST), a plurality of bits are transmitted. The symbol period is divided into a plurality of shift indexes with each shift index representing a particular bit pattern. The information, i.e., bit pattern, is conveyed by rotating the spreading waveform by a certain amount corresponding to the data to be transmitted. The data is conveyed in the degree of rotation or circular shift applied to the spreading waveform (also referred to as a chirp) before it is transmitted.

In a CSK system, the data is conveyed in the absolute shift assigned to the spreading waveform. In a DCSK system, the data is conveyed in the shift differential between consecutive symbols. The synchronization scheme of the present invention is applicable to both CSK and DCSK transmission systems.

Upon reception by the receiver, the signal is input to a matched filter having a template of the spreading waveform pattern to detect the amount of rotation (or circular shift) within the received signal for each symbol. The received data is fed into a cyclic correlator wherein the contents are periodically circularly shifted and a correlation output generated therefrom. Cyclic correlation may be achieved by inputting the received data to a shift register whose output is fed back to its input and circularly rotating, i.e., shifting, the contents of the shift register. The output of the shift register is input to a matched filter. For each bit shift or rotation, the matched filter generates a correlation sum. A shift index is determined for each UST corresponding to the shift index that yields the maximum (or minimum) correlation sum. Differential shift indexes are generated by subtracting the currently received shift index from the previously received shift index. The differential shift index is then decoded to yield the originally transmitted data.

Spread spectrum communications systems based on DCSK or CSK modulation are described in more detail in U.S. Pat. No. 6,064,695, to Raphaeli, entitled "Spread Spectrum Communication System Utilizing Differential Code Shift Keying," incorporated herein by reference in its entirety. Note, however, that one skilled in the communication arts may apply the techniques of the present invention to other modulation techniques as well.

With reference to FIG. 1, the example network 10 comprises imposter, victim and receiver/destination nodes. In the network, transmitting stations transmit data in the form of packets to receiving stations. Each packet is preceded by a synchronization sequence. The length of the synchronization sequence can be any suitable number of symbols such that receiving stations are able to synchronize with the transmitting station.

The mechanism of the present invention uses the concept of an emergency packet that is sent during a special time window referred to as an emergency window that follows the end of each packet. Alternatively, the emergency window can be defined in any other time slot as long as all nodes have knowledge of the time slot. Before transmitting, stations listen during the emergency window for the transmission of an emergency packet sent in response to the detection by a victim node of the presence of an imposter node. The emergency packet comprises a special packet that is recognized by all nodes as an emergency packet since it is only transmitted during the emergency window.

The function of the emergency packet is to inform the network about the presence of an imposter node. An imposter node is defined as a node that illegally transmits a packet utilizing a source address belonging to another node. A victim node is defined as a node that recognizes that an imposter node has transmitted a packet incorporating its own address as the source address of the packet. A receiver node (i.e. destination node) is defined as the node that receives a packet either from the imposter node or from a legitimate node. A carrier signal is defined as a signal modulated in accordance with the particular modulation scheme used to communicate between nodes in the network.

Note that it is assumed that all nodes in the network hear the signals transmitted over the line, i.e. media. It is assumed that nodes on the network have a carrier sense capability whereby each node first listens to the media and transmits only if the media is not occupied. In accordance with the present invention, all nodes listen to the media and hear the packets transmitted by other nodes. At the end of each transmission, all nodes check if the packet just transmitted was addressed to them or if the packet was sent from an imposter. If a node detects that a packet has been sent using its own address, the node is then a victim node and it sends an emergency packet to the receiver node. The emergency packet is transmitted immediately after the imposter packet was received in the beginning of the special time window defined and reserved for transmission of emergency packets only. In accordance with the invention, receiver nodes withhold transferring packets to the upper communication layers until it is certain that no emergency packet was transmitted during the emergency window.

Figure 2:
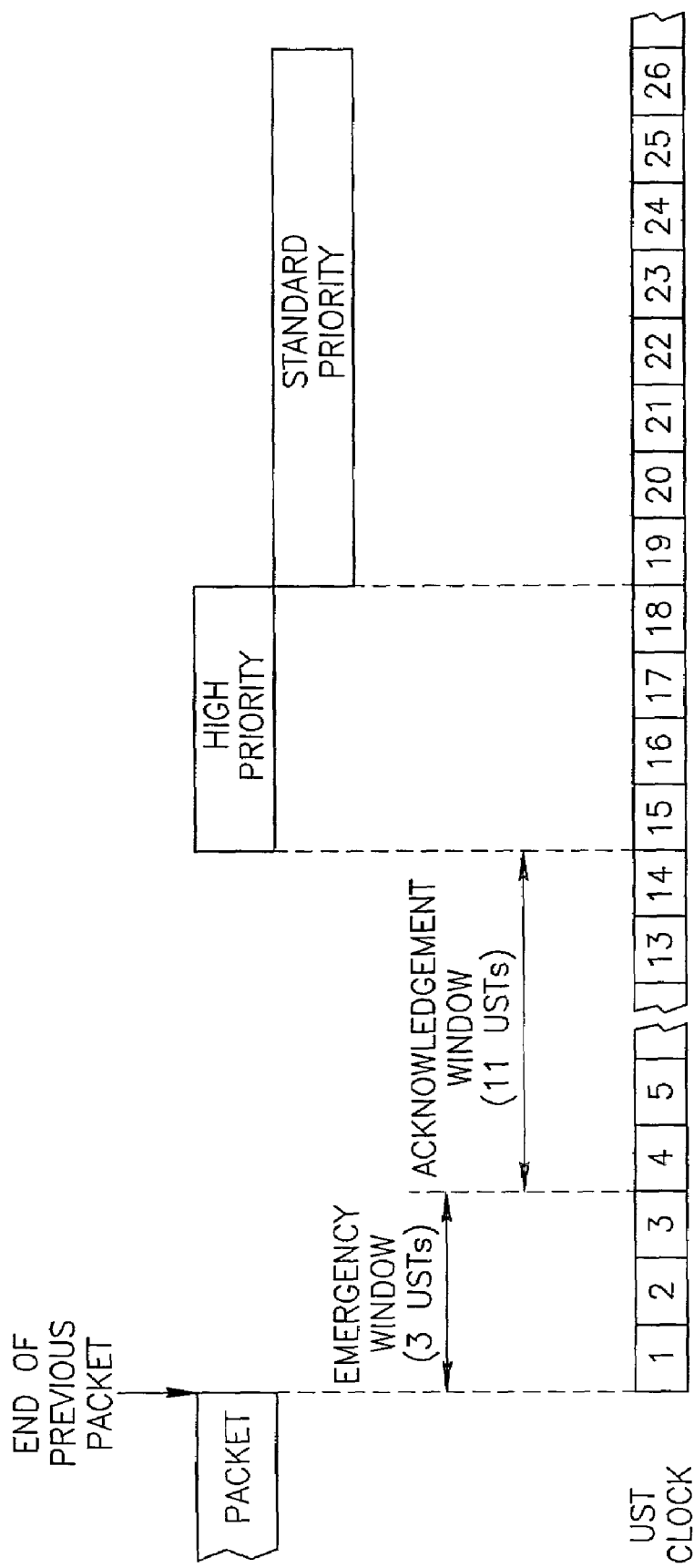
FIG. 2 is a diagram illustrating the format for the emergency and acknowledgement windows in accordance with the present invention.

A diagram illustrating the format for the emergency and acknowledgement windows in accordance with the present invention is shown in FIG. 2. The emergency window in the example presented herein is three USTs. The ticks of the UST clock are shown starting from the end of the previous packet. The emergency window is a three UST time interval between the end of the received packet and the acknowledgement window. During this time, no node other than the victim node may transmit.

An 11 UST acknowledgement window follows the emergency window. If the packet just received is to be acknowledged, the acknowledgement is sent during this window. The contention window for the next packet begins following the end of the acknowledgement window wherein two priority levels are shown as an example.

In normal operation, the receiver node receives the packet but does not yet know if the packet just received is a legitimate packet or is an imposter packet sent by an imposter node. Before the receiver node sends any acknowledgement or transfers the packet to the upper communication layers for processing, it must make sure the packet is not an impostor packet. This is achieved by listening to the line for carrier signal during the emergency window. If carrier signal is detected during the emergency window, one of the following four scenarios occurs:

1. The emergency packet is received correctly and the receiver subsequently informs the upper communication layers about the imposter. In this case, the carrier signal detected represents the beginning of the emergency packet. The entire emergency packet then follows and is received correctly by the receiver node.
2. The imposter node attempts to jam the reception of the emergency packet by the receiver node by intercepting the transmission of the emergency packet so it cannot be received correctly by the receiver node. In this case, the imposter node has knowledge of the protocol used by the network. If the imposter node jams the emergency packet using the same symbols or communication signals as used by the network, it is likely that the carrier signal will be detected by the receiver node even though the emergency packet cannot be correctly received. In this case, the detection of carrier signal indicates the presence of an imposter regardless of whether the emergency packet is received or not.
3. The carrier signal detected was a false carrier detect and there is actually no imposter in the network.
4. The imposter transmits noise large enough to mask the receiver. Note that some type of energy detection means can he used to detect this.

In the second and third scenarios wherein only a carrier signal was detected during the emergency window and no emergency packet is received, the receive node acts as follows. The receiver node broadcasts a message (i.e. to the entire network) known as an emergency packet request (EPR) message during the acknowledgement window in place of the acknowledgement packet that normally would have been transmitted during that time. The victim node receives the EPR message and in response sends another emergency packet during the emergency window. The victim node remembers that it had previously sent the original emergency packet.

This process is repeated a certain number of times, e.g., three, and if after repeated attempts the receive node still detects the presence of carrier signal but cannot correctly receive the emergency packet due to jamming by the imposter, it notifies the upper communication layers that an imposter is present in the network. Thus, verification (i.e. receipt of the emergency packet) by the victim node is not required in the case of repeated jamming by the imposter node.

Note that if no carrier signal is detected during the emergency window, the packet is transferred as normal to the upper communication layers for further processing. Preferably, once the presence of an imposter is detected, the entire network is informed as soon as possible. This function is typically the responsibility of the communication layers above the data link layer (DLL). In one embodiment, the data link layer passes the imposter packet to the upper layers with a flag indicating that it was received from an imposter node and an indication whether the detection of the imposter was conformed. The detection of the imposter node is confirmed if the receiver node successfully receives the emergency packet from the victim node.

Figure 3:
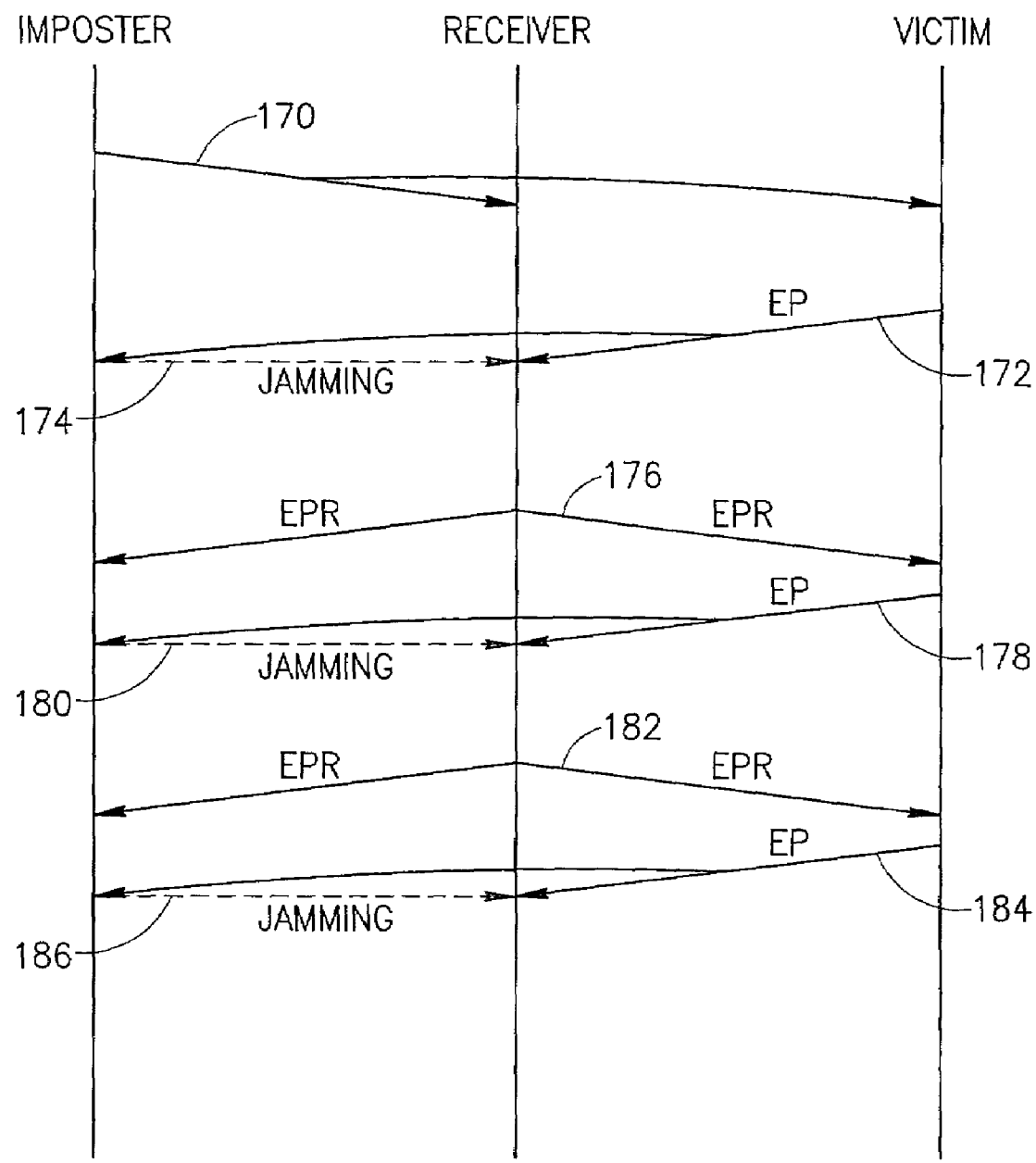
FIG. 3 is a message flow diagram illustrating sequence of messages that are sent in response to detection of an intruder node in accordance with the present invention.

A message flow diagram illustrating sequence of messages that are sent in response to detection of an intruder node in accordance with the present invention is shown in FIG. 3. The imposter transmits a packet with the source address of another active node that is received by both the victim and receive nodes (referenced 170). The victim node, in response to detecting the packet with its own address, sends an emergency packet that is heard by both the imposter and the receive nodes (referenced 172). If the receive node successfully receives the emergency packet, the message flow ends and the receive node informs the upper communication layers of the presence of the intruder in the network.

If, however, the imposter node jams the reception or the emergency packet (indicated by the dashed arrow 174) but the receive node detects carrier signal during the emergency window, it broadcasts an emergency packet request (referenced 176). The victim node hears the EPR message and resends the emergency packet (referenced 178). The imposter may again jam the emergency packet message (referenced 180) and the process may repeat a predefined number of times (three in the example presented herein). In this case, the receive node transmits the EPR message (referenced 182) again and the victim node resends the emergency packet (referenced 184) which is again jammed by the impostor (referenced 186).

As described above, in this case, even though the receive node does not successfully receive the emergency packet, it nevertheless informs the upper layers of the presence of the imposter node.

The present invention also provides for the following exception case whereby the victim node is also the receive node. In other words, the imposter sends a packet to the victim node wherein both the source and destination addresses are the same as that of the victim node. In this case, there is no need to send an emergency packet, since the receive node (i.e. itself) already knows about the imposter. Thus, the victim node immediately transfers the packet to the upper layers with an indication that the packet is from an imposter node and that the presence of the imposter is confirmed.

Note that in this example, the emergency packet and emergency packet request are broadcast and comprise a regular packet having a control field configured to indicate that the packet is either an emergency packet or an emergency packet request. Alternatively, the emergency packet is not broadcast but transmitted by unicast means as long as the receiver knows the address of the victim. In the case where the message from the imposter was broadcast, the emergency packet is preferably also broadcast. Note that the length of the emergency window is not necessarily equal to the length of the emergency packet.

Figure 4A:
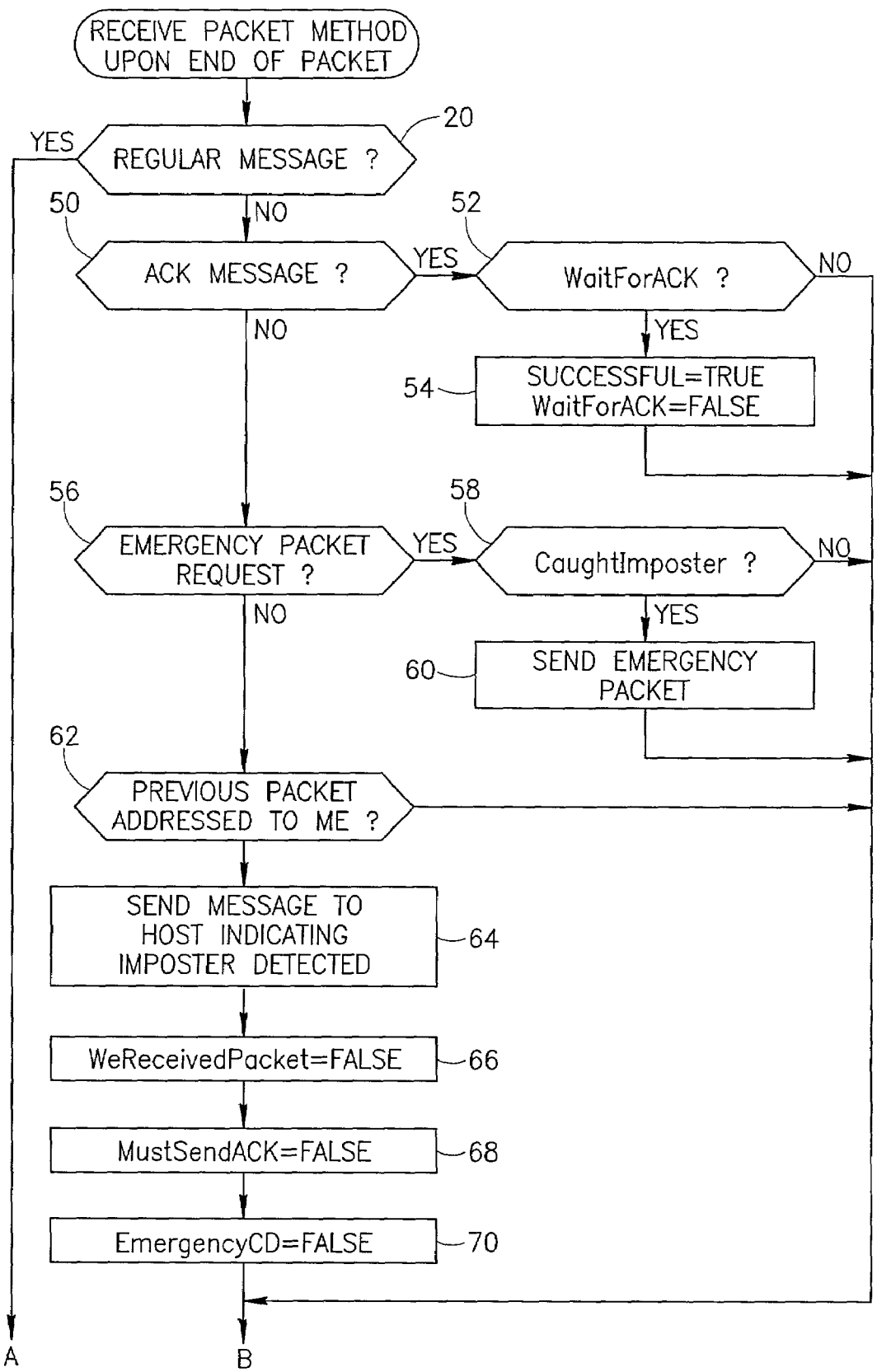
FIGS. 4A and 4B are a flow diagram illustrating the receive packet method of the present invention that is performed upon the end of each packet transmitted on the network.
Figure 4B:
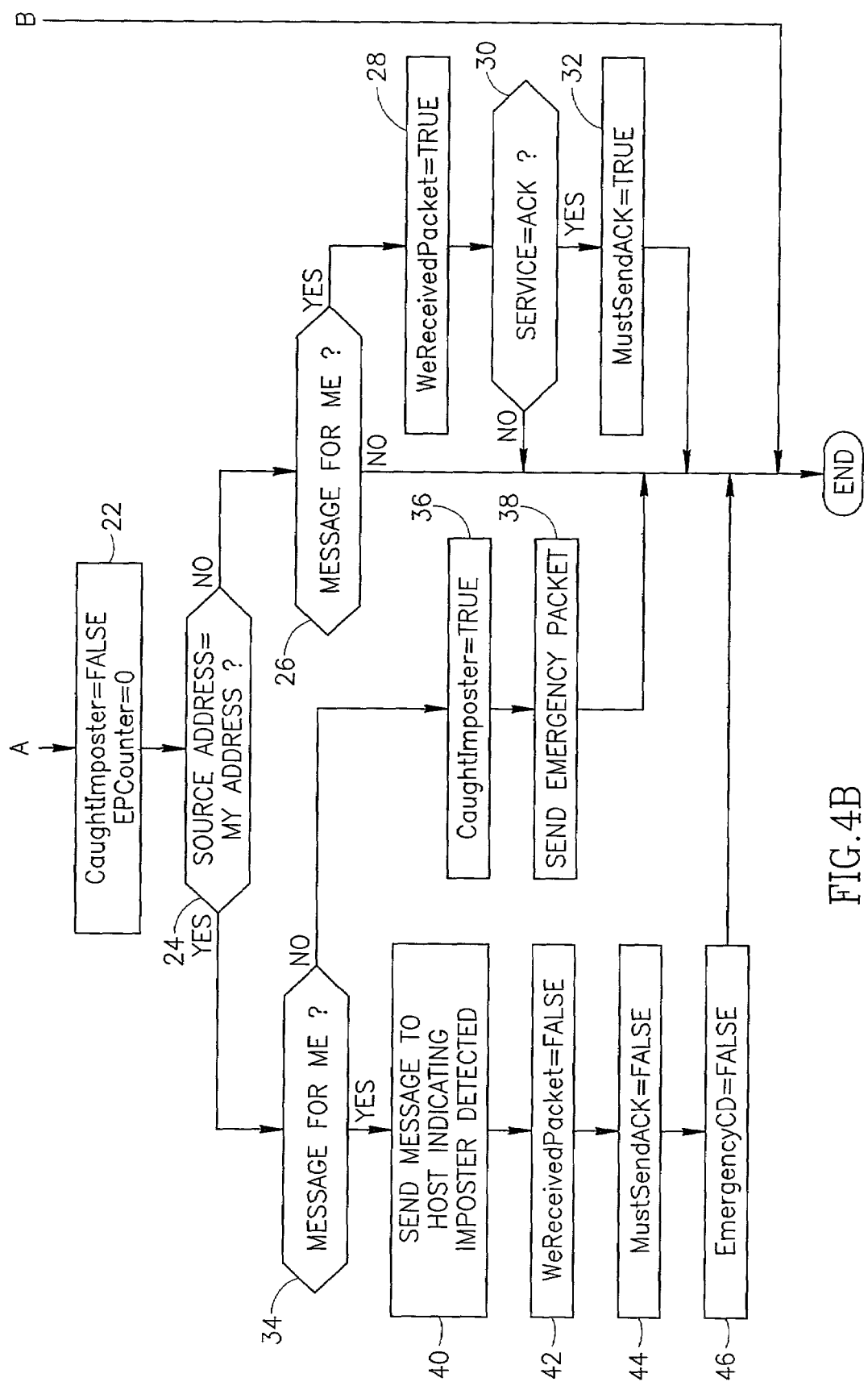

A flow diagram illustrating the receive packet method of the present invention that is performed upon the end of each packet transmitted on the network is shown in FIGS. 4A and 4B. This method is performed by each node at the end of the just received packet, before the beginning of the emergency window (i.e. before UST #1). It is typically performed by the data link layer (i.e. MAC layer) within the node.

As stated above, all the nodes in the network normally listen to the media. When a packet is received, it is first determined whether the packet is a data packet (i.e. regular message) or if it is an acknowledgement packet, emergency packet or an emergency request packet (step 20). The processing of the packet is determined by the packet type.

If the packet is not a regular message, it is checked whether the packet is an acknowledgement packet (step 50). If it is, only the node that is waiting for an acknowledgement processes this packet any further (step 52). All other nodes exit the method. A WaitForACK flag is used to indicate that a node previously sent a message using acknowledged service and thus expects to receive an acknowledgement packet. Upon receipt of the acknowledgement packet by the node with the WaitForACK flag set, Successful flag is set and the WaitForACK flag is reset to false (step 54). The Successful flag indicates that a message was sent successfully, i.e. an acknowledgment was received. The node waiting for the ACK, thus regards the last session as successful since an ACK was received.

If the received packet is an emergency packet request (step 56), only the node expecting this message processes the message any further (step 58). All other nodes exit the method. A CaughtImposter flag is used to indicate that a victim node previously detected the existence of an imposter in the network. This message is sent by the receiver node that had previously detected a carrier signal during the emergency window but did not receive an emergency packet following the carrier signal.

If this is not a case of false carrier detect, the node expecting this message is the node that had originally detected the imposter node and in response, set its CaughtImposter flag true and sent an emergency packet. In response to receipt of the EPR message by the victim node, the victim node resends the emergency packet (step 60).

If the received packet is not an acknowledgement packet or an emergency packet request message, than by default it must be an emergency packet. In this case, only the node that this message is intended for processes the message any further (step 62). All other nodes exit the method. All nodes listen to the media during the emergency window and know that the incoming packet is an emergency packet. A node determines that the emergency packet is intended for it if the last received message was addressed to it. A WeReceivedPacket flag is used to indicate that a node was the last node to receive a packet.

In this case, the node is the receiver node and the originally received packet is transferred to the upper layers, to the host, external processor, etc. depending on the implementation, informing about the detection of an imposter node in the network such as via the setting of certain bits in the message, etc. (step 64). A MessageToHost flag may be used to indicate that the last received message is to be forwarded to the host for higher level processing. The WeReceivedPacket flag is reset false (step 66). A MustSendACK flag used to indicate that an acknowledgement packet is to be sent is set to false since in this case, the message from the imposter should not be acknowledged (step 68). In addition, an EmergencyCD flag that was set by the PHY layer to indicate that a carrier signal was detected during the emergency window is reset by the data link layer to false (step 70).

If a regular message is received (step 20), the CaughtImposter flag is initialized to false and an EP Counter used to count the number of emergency packet request messages that have been sent is initialized to zero (step 22). If a node detects that the source address of the received packet matches its own address (step 24), it determines that the message was from an imposter. If the destination address of the packet was addressed to another node (i.e. a receiver node other than itself) (step 34), the victim node informs the receiver node about the imposter. The victim node does this by sending an emergency packet during the emergency window. The victim node first sets the CaughtImposter flag to true (step 36) and a SendEmergencyPacket flag to true to indicate that an emergency packet is to be sent during the emergency window (step 38).

If the received packet is addressed to the node (i.e. the victim node is also the receive node) (step 34), en emergency packet does not need to be sent and the node transfers the originally received packet to the upper communication layers, the host, external processor, etc. depending on the implementation, informing about the detection of an imposter node in the network such as via the setting of certain bits in the message, etc. (step 40). The MessageToHost flag is set to indicate that the last received message is to be forwarded to the host for higher level processing. The WeReceivedPacket flag is reset to false (step 42). The MustSendACK flag is set to false since the message from the imposter is not to be acknowledged (step 44). In addition, the EmergencyCD flag is reset to false (step 46).

If the source address of the received packet does not match that of the node (step 24), it is checked whether the received packet is addressed to the node (i.e. the destination address is the node's address) (step 26). If so, the WeReceivedPacket flag is set to true (step 28) and the packet is processed further. If the type of service requires an ACK packet (step 30), the node must send an ACK packet during the acknowledgement window (unless it receives an emergency packet during the emergency window). The MustSendACK flag is set to true to indicate that an ACK message is to be sent (step 32). If the service is unacknowledged service, the node exits the method.

Figure 5A:
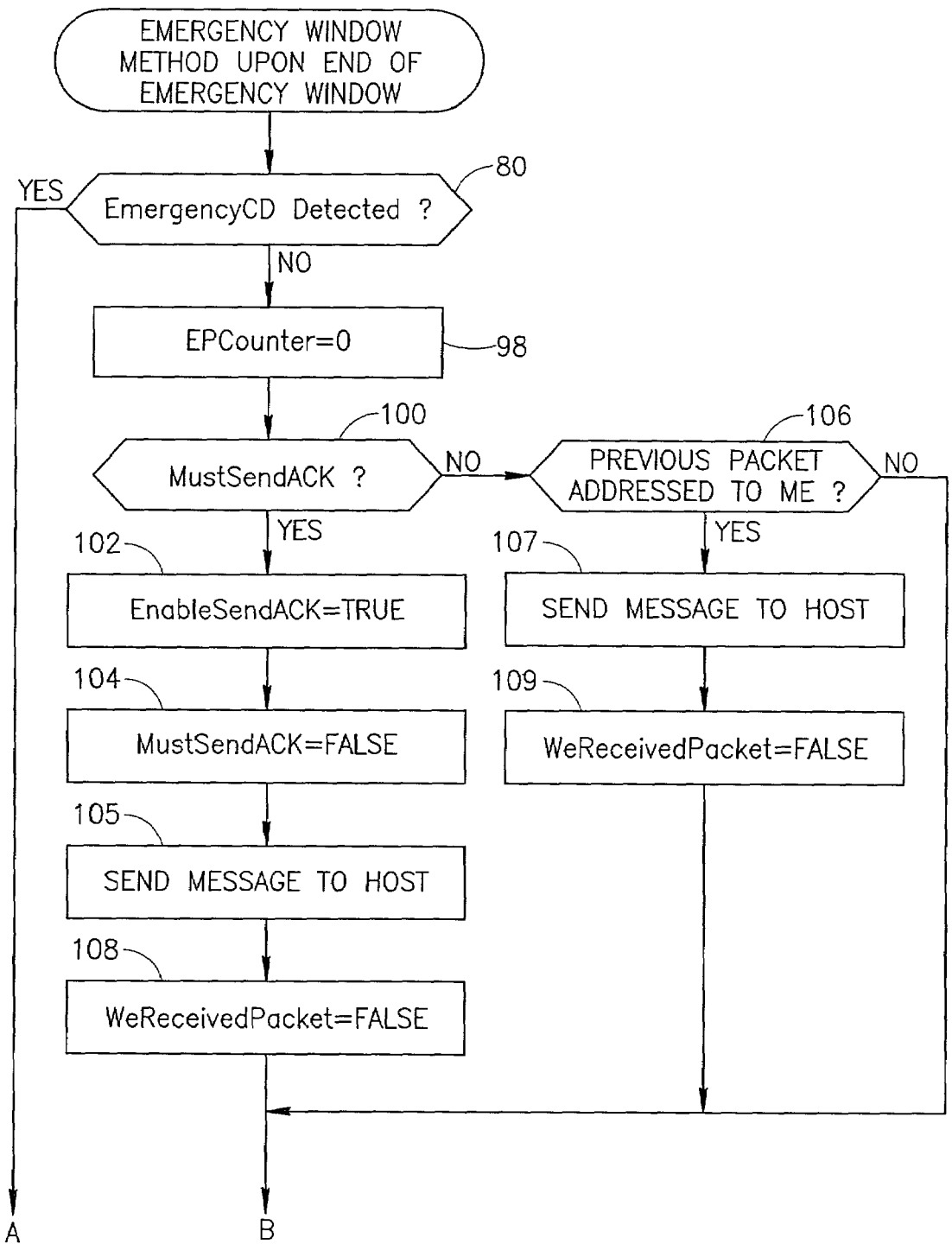
FIGS. 5A and 5B are a flow diagram illustrating the emergency window method of the present invention performed upon the end of the emergency window.
Figure 5B:
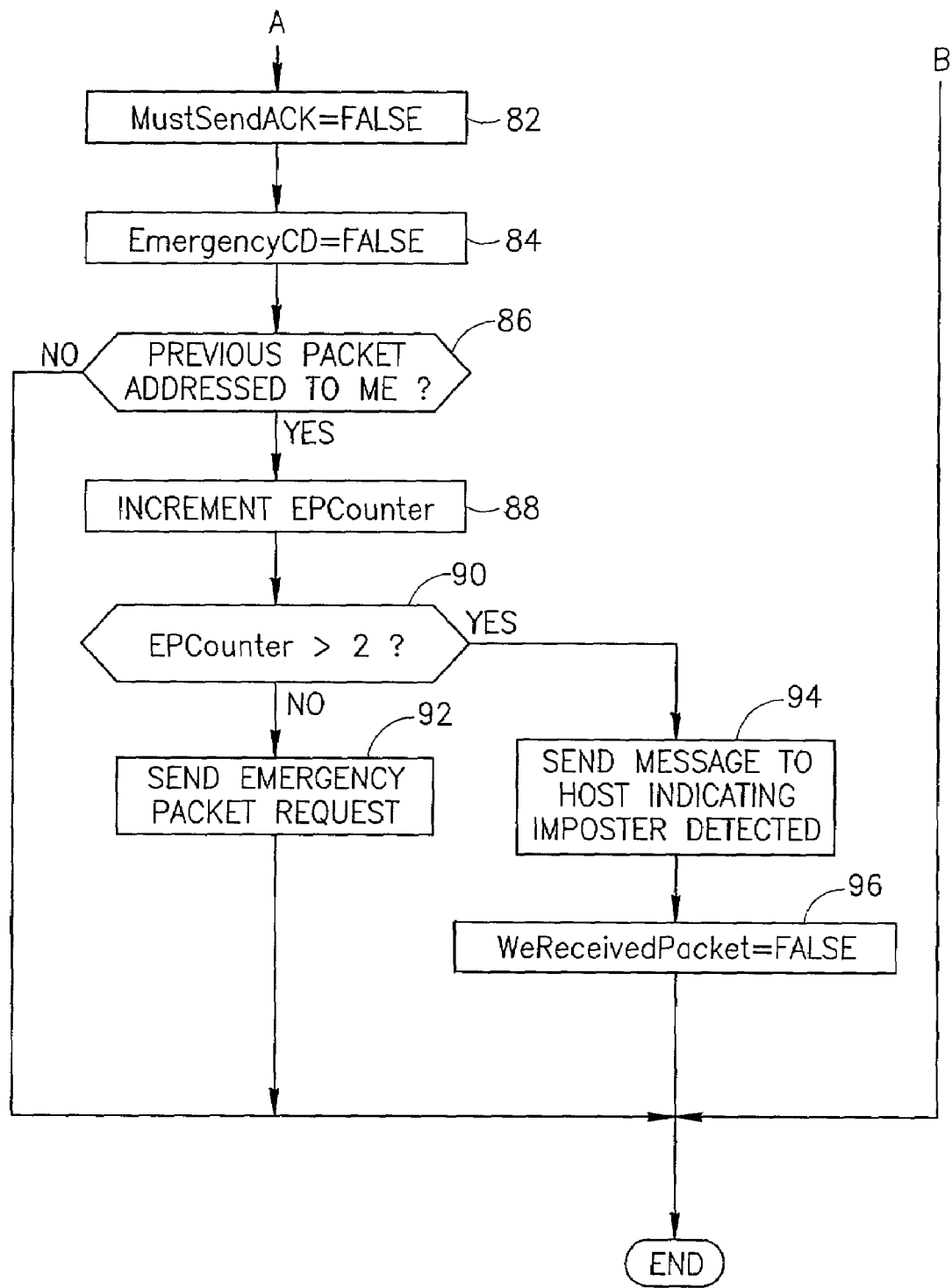

A flow diagram illustrating the emergency window method of the present invention performed upon the end of the emergency window is shown in FIGS. 5A and 5B. This method is also performed by all nodes in the network at the end of the emergency window, at the time of the beginning of the acknowledgement window, i.e. before UST #4 (FIG. 2). At the beginning of the acknowledgement window, the emergency time window has passed and each node checks if carrier signal was detected during the emergency time window (step 80). This is determined by checking the state of the EmergencyCD flag that is set by the PHY layer if carrier signal is detected.

If not, the packet processing proceeds as normal. The EP Counter is initialized to zero (step 98). If the node is supposed to send an acknowledgement packet (step 10), it may do so by first setting EnableSendACK flag to true since no carrier signal was detected during the emergency window (step 102). This flag is used to indicate that an acknowledgement is to be sent now. It differs from the MustSendACK flag which is used to indicate that an ACK may potentially need to be sent, but is not certain until further checking is done. The MustSendACK flag is cleared to false (step 104), the received message is sent to the host (i.e. MessageToHost flag is set) (step 107) and the WeReceivedPacket flag is reset to false (step 108).

If a node is not to send an acknowledgement (step 100), it is checked if the packet just received was addressed to that particular node (step 106). This is performed by checking the state of the WeReceivedPacket flag. If the WeReceivedPacket flag is set, the packet was intended for the node. If the WeReceivedPacket flag is not set, it means that the received packet was either not intended for this node or the service type was unacknowledged service. If the WeReceivedPacket flag is set, i.e. the message was addressed to this node, the received message is forwarded to the host (step 107) and the WeReceivedPacket flag is cleared to false (step 109).

If there was a carrier detect during the emergency window, i.e. the EmergencyCD flag is set due to an attempt by the victim node to send an emergency packet (step 80), no acknowledgement will be sent from any node during the acknowledgement window since the imposter should not be acknowledged. The MustSendACK flag is thus set to false (step 82). The EmergencyCD flag set by the PHY layer is cleared to false (step 84). It is then checked if the node was the receive node, i.e. the previous packet was addressed to it (step 86). All other nodes exit the method.

If the node is the receive node (i.e. WeReceivedPacket flag is true) (step 86), the emergency packet counter (EP Counter) is incremented by one (step 88). The node that received the last packet knows that the carrier signal was detected during the emergency window from an emergency packet intended for it. The node thus suspects that an emergency packet was sent to it but was jammed by the imposter.

If the EP Counter is not greater than a predefined limit (e.g., two in this example for attempting to send the emergency packet a total of three times) (step 90), the node sets the SendEPR flag to true to indicate that an EPR message is to be sent (step 92).

If the EP Counter is greater than the predefined limit (step 90), the node does not send any more emergency packet request messages, but rather sends the host the suspected received imposter packet with an indication that the presence of an imposter is suspected (step 94). This occurs only after the node sent two emergency packet request messages. The WeReceivedPacket flag is reset to false (step 96).

In an alternative embodiment, the victim node sends the emergency packet many times with the first time being during the emergency packet window. The remainder of the times is after relatively large random backoff times. Only upon receipt of an emergency packet request message does the victim node stop sending emergency packets. This forces the imposter to jam the network forever in order to evade detection. The random backoff times ensure that the imposter will not know which packets to jam.

Thus, to ensure that the network is informed about an imposter the victim node transmits a regular packet to the Network Administrator informing that someone used its address. The regular packet is transmitted after the emergency packet and emergency packet request session. This packet is preferably transmitted as a regular packet since the timing of such a packet is unknown and therefore very difficult to predict by the imposter node.

Station Incorporating the Intruder and Jamming Mechanism

The intruder and jamming detection mechanism of the present invention may be incorporated in a communications transceiver such as a station, network node, modem, etc. One example application is in a digital modem adapted for communications over the power line media. The modem utilizes a 100–400 kHz band (for in the United States) or 95–125 kHz and 20–80 kHz band (in Europe). The modulation used is CSK or DCSK and the modem is capable of unicast, broadcast and multicast transmissions using the spread spectrum modulated signal in the appropriate band. Each packet transmitted comprises a synchronization sequence which permits the receiver to synchronize on the spreading waveform (i.e. chirp) followed by the packet data modulated as circularly shifted data chirps. As described above, the synchronization sequence is processed through a linear correlator while the data is decoded using cyclic correlation.

Figure 6:
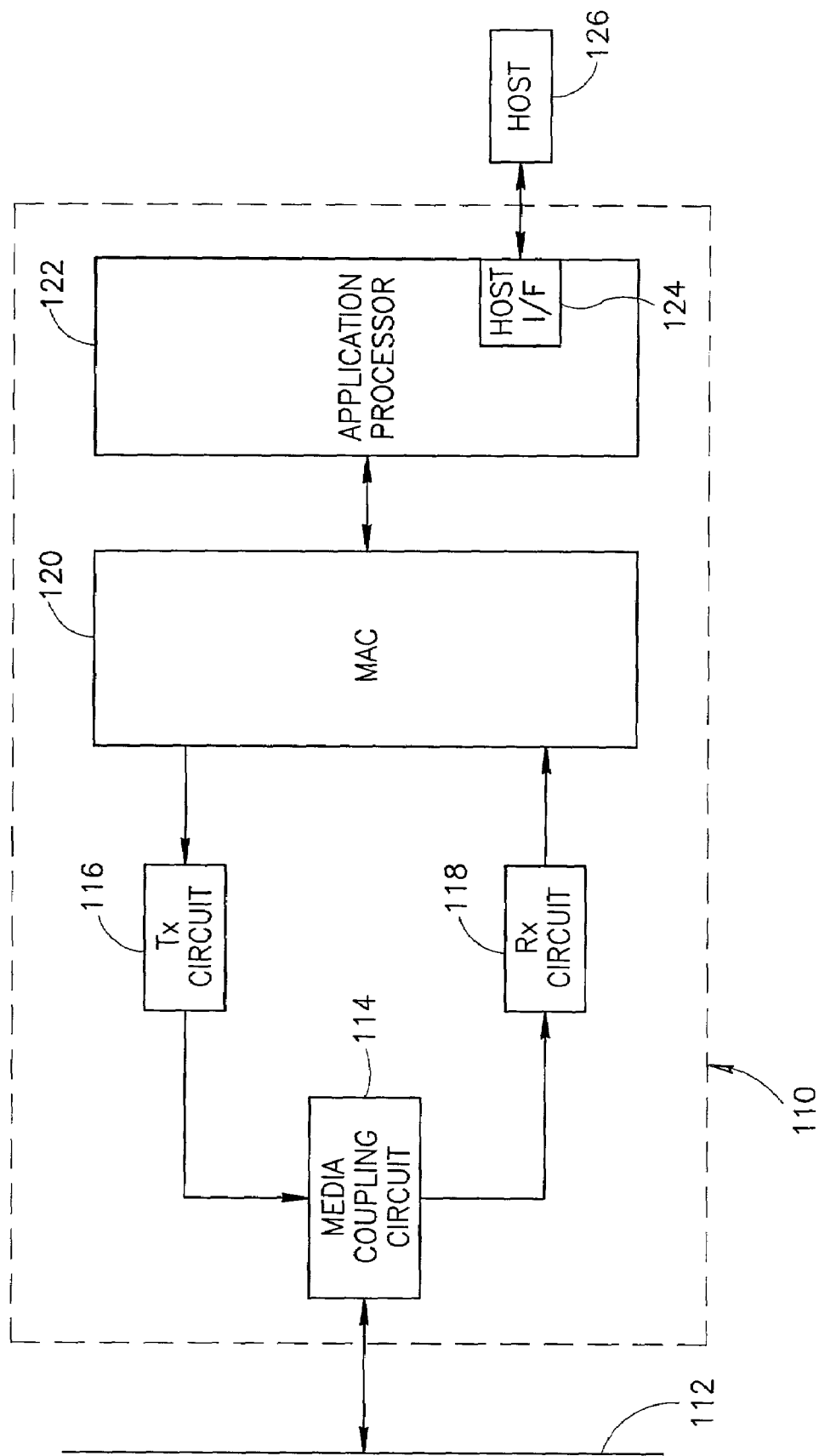
FIG. 6 is a block diagram illustrating an example embodiment of a station incorporating transmitter and receiver circuits adapted to perform the intrusion and jamming detection mechanism of the present invention.

A block diagram illustrating an example embodiment of a station incorporating transmitter and receiver circuits adapted to perform the intruder and jamming detection mechanism of the present invention is shown in FIG. 6. The station, generally referenced 110, represents a station that may operate stand alone or may be incorporated within a network device such as a switch, router, hub, broadband modem, cable modem, PLC based modem, etc. for performing communication functions (i.e. implementing OSI stack protocol functions including MAC functionality). The station comprises an application processor 122 with associated static, dynamic, volatile and/or non-volatile memory (not shown) in communication therewith. The application processor is also in communication, via a host interface 124, with a host device 126. The host may be adapted to communicate over one or more networks, e.g., LAN, WAN, etc.

The station comprises media coupling circuitry 114 for interfacing the station to the shared media 112. The transmit circuit 116 receives data for transmission from the MAC and functions to encode the data into symbols which are then modulated and transmitted over the media. The transmit circuit 116 and receive circuit 118 communicate over the media via the media coupling circuitry. The receive circuit functions to correlate and decode the received signal and generate received output data therefrom.

The media access controller (MAC) 120 functions, on one side, to output transmit data to the transmit circuit and to input receive data from the receive circuit. On the processor side, it interfaces to the application processor. The MAC is adapted to implement any suitable layer 2 (i.e. data link layer) media access control technique well known in the art. The MAC circuit is also adapted to implement the intruder and jamming detection mechanism of the present invention, described in detail supra.

Computer Embodiment

Figure 7:
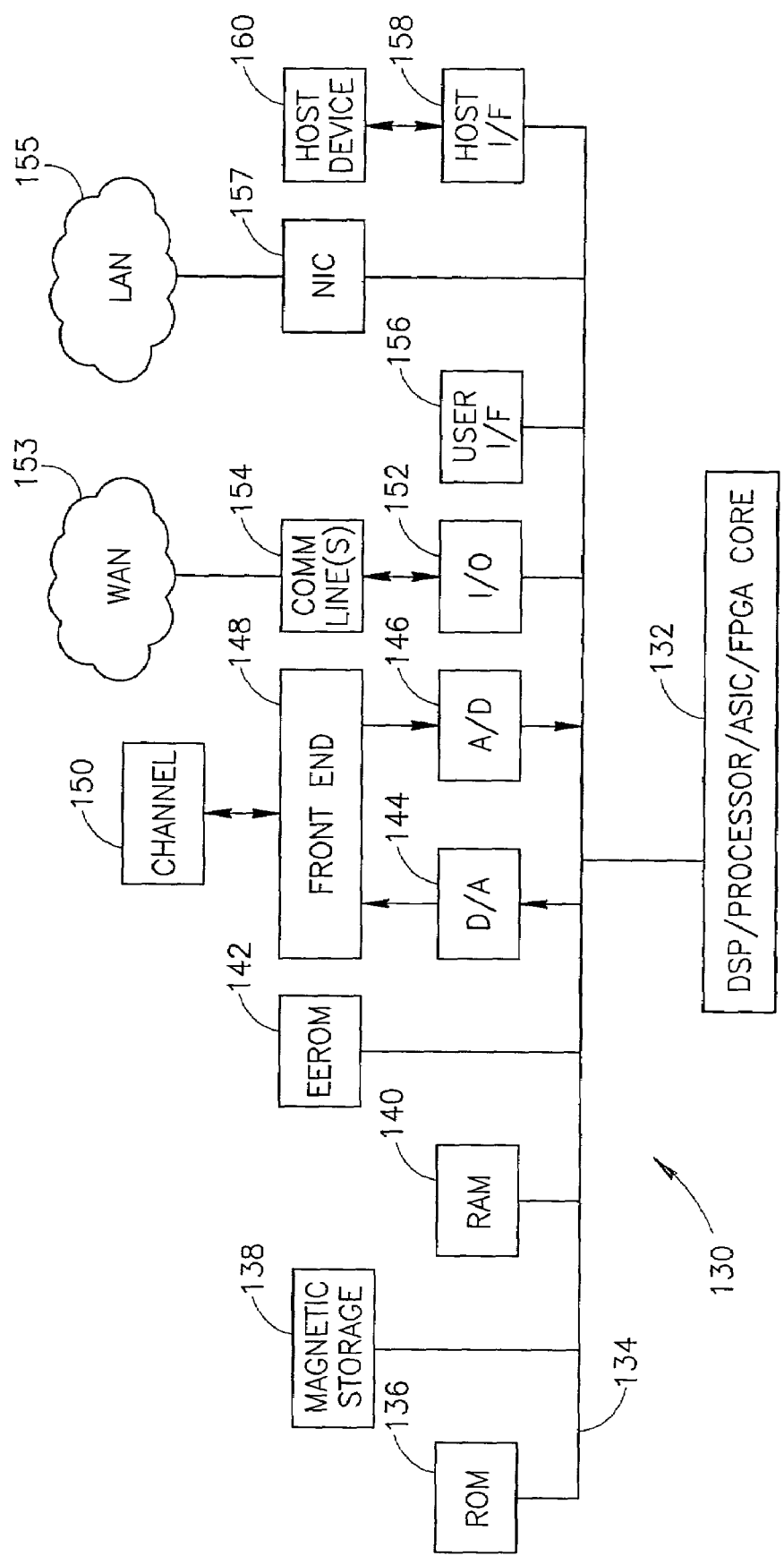
FIG. 7 is a block diagram illustrating an example computer processing platform suitable for executing the software of the present invention.

Note that the intruder and jamming detection mechanism may be implemented in either hardware or software. For example, a computer may be programmed to execute software adapted to perform the intruder and jamming detection mechanism of the present invention or any portion thereof. A block diagram illustrating an example computer processing platform suitable for executing the intruder and jamming detection mechanism of the present invention is sown in FIG. 7. The system may be incorporated within a communications device such as a PDA, cellular telephone, cable modem, broadband modem, laptop, PC, network transmission or switching equipment, network device or any other wired or wireless communications device. The device may be constructed using any combination of hardware and/or software.

The computer system, generally referenced 130, comprises a processor 132 which may be implemented as a microcontroller, microprocessor, microcomputer, ASIC core, FPGA core, central processing unit (CPU) or digital signal processor (DSP). The system further comprises static read only memory (ROM) 136 and dynamic main memory (e.g., RAM) 140 all in communication with the processor. The processor is also in communication, via a bus 134, with a number of peripheral devices that are also included in the computer system.

The device is connected to a network 153, e.g., WAN, etc. such as the Internet via an I/O interface 152 and one or more communication lines 154. The interface comprises wired and/or wireless interfaces to one or more communication channels. Communications I/O processing transfers data between the network interface and the processor. The computer system may also be connected to a LAN 155 via a Network Interface Card (NIC) 157 adapted to handle the particular network protocol being used, e.g., one of the varieties of copper or optical Ethernet, Token Ring, etc.

The processor is also in communication, via the bus, with a number of peripheral devices that are also included in the computer system. An A/D converter 146 functions to sample the baseband signal output of the front end circuit 148 coupled to the channel 150. Samples generated by the processor are input to the front end circuit via D/A converter 144. The front end circuit comprises receiver, transmitter and channel coupling circuitry.

An optional user interface 156 responds to user inputs and provides feedback and other status information. A host interface 158 connects a host computing device 160 to the system. The host is adapted to configure, control and maintain the operation of the system. The system also comprises magnetic storage device 138 for storing application programs and data. The system comprises computer readable storage medium which may include any suitable memory means including but not limited to magnetic storage, optical storage, CD-ROM drive, ZIP drive, DVD drive, DAT cassette, semiconductor volatile or non-volatile memory, biological memory devices, or any other memory storage device.

Software operative to implement the functionality of the intruder and jamming detection mechanism of the present invention or any portion thereof is adapted to reside on a computer readable medium, such as a magnetic disk within a disk drive unit or any other volatile or nonvolatile memory. Alternatively, the computer readable medium may comprise a floppy disk, Flash memory card, EPROM, EEROM, EEPROM based memory, bubble memory storage, ROM storage, etc. The software adapted to perform the intruder and jamming detection mechanism of the present invention or any portion thereof may also reside, in whole or in part, in the static or dynamic main memories or in firmware within the processor of the computer system (i.e. within microcontroller, microprocessor, microcomputer, DSP, etc. internal memory).

In alternative embodiments, the method of the present invention may be applicable to implementations of the invention in integrated circuits, field programmable gate arrays (FPGAs), chip sets or application specific integrated circuits (ASICs), DSP circuits, wireless implementations and other communication system products.

For the purpose of this document, the terms switching systems products shall be taken to mean private branch exchanges (PBXs), central office switching systems that interconnect subscribers, toll/tandem switching centers and broadband core switches located at the center of a service provider's network that may be fed by broadband edge switches or access multiplexers and associated signaling and support system services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of detecting intrusion attempts by an imposter in a communications network, said method comprising the steps of:
   at a victim node, determining that a received packet comprises an address corresponding to said victim node; and in response thereto,
   transmitting an emergency packet;
   at a destination node, receiving said emergency packet and, in response thereto, generating an intrusion attempt indication;
   at a destination node, detecting a carrier signal not followed by receipt of said emergency packet, and in response thereto transmitting an emergency packet request; and
   at said victim node, resending said emergency packet in response to receipt of said emergency packet request.

2. The method according to claim 1, wherein said emergency packet is transmitted within an emergency window following the end of the received packet.

3. The method according to claim 1, wherein receipt of said carrier signal is checked during an emergency window following the end of the received packet.

4. The method according to claim 1, wherein said emergency packet request is transmitted during an acknowledgement window that follows an emergency window.

5. The method according to claim 1, further comprising the steps of:
   repeatedly transmitting said emergency packet request a predefined number of times if said carrier signal is detected without receipt of an emergency packet; and generating an intrusion attempt indication upon failure to receive said emergency packet.

6. The method according to claim 5, wherein said predefined number of times equals two.

7. The method according to claim 1, further comprising the step of sending said received packet along with said intrusion attempt indication to a host.

8. The method according to claim 1, further comprising the step of determining whether said victim node is also a destination node and if so, generating said intrusion attempt indication without transmitting said emergency packet.

9. The method according to claim 1, further comprising the step of continually resending said emergency packet with random backoff times until receiving an indication of receipt by the destination node.

10. The method according to claim 1, further comprising the step of said victim node transmitting a regular packet to a Network Administrator entity indicating said imposter node used its address.

11. The method according to claim 1, wherein said method is implemented in an Application Specific Integrated Circuit (ASIC).

12. The method according to claim 1, wherein said method is implemented in a Field Programmable Gate Array (FPGA).

13. A method of detecting intrusion attempts by an imposter for use in a victim node in a communications network, said method comprising the steps of:
determining that a received packet comprises a source address corresponding to itself; and in response thereto, transmitting an emergency packet to a destination node; and
resending said emergency packet in response to receipt of an emergency packet request transmitted from said destination node.

14. The method according to claim 13, wherein said emergency packet is transmitted within an emergency window following said received packet.

15. The method according to claim 13, further comprising the step of determining whether said victim node is also a destination node and if so, generating an intrusion attempt indication.

16. The method according to claim 13, further comprising the step of continually resending said emergency packet with random backoff times until receiving an indication of receipt by the destination node.

17. The method according to claim 13, wherein said method is implemented in an Application Specific Integrated Circuit (ASIC).

18. The method according to claim 13, wherein said method is implemented in a Field Programmable Gate Array (FPGA).

19. A method for use in a destination node of detecting intrusion attempts by an imposter in a communications network, said method comprising the steps of:
receiving a packet transmitted over said communications network;
listening during an emergency window for the presence of carrier signal;
if carrier signal is detected during said emergency window and an emergency packet is received subsequent thereto, generating an intrusion attempt indication; and
if carrier signal is detected during said emergency window and no emergency packet is received subsequent thereto, transmitting an emergency packet request and repeating said step of listening.

20. The method according to claim 19, wherein receipt of said carrier signal is checked during said emergency window following the end of the received packet.

21. The method according to claim 19, wherein said emergency packet request is transmitted during an acknowledgement window following said emergency window.

22. The method according to claim 19, further comprising the steps of:
repeatedly transmitting said emergency packet request a predefined number of times if said carrier signal is detected without receipt of an emergency packet; and
generating an intrusion attempt indication upon failure to receive said emergency packet.

23. The method according to claim 22, wherein said predefined number of times equals two.

24. The method according to claim 19, further comprising the step of sending said received packet along with said intrusion attempt indication to a host.

25. The method according to claim 19, further comprising the step of continually resending said emergency packet with random backoff times until receiving an indication of receipt by the destination node.

26. The method according to claim 19, wherein said method is implemented in an Application Specific Integrated Circuit (ASIC).

27. The method according to claim 19, wherein said method is implemented in a Field Programmable Gate Array (FPGA).

28. An Application Specific Integrated Circuit (ASIC) for use in a node for detecting intrusion attempts by an imposter in a communications network, said ASIC comprising:
means for determining that a received packet comprises an address corresponding to said node;
means for transmitting an emergency packet following the end of said received packet if said node determines said received packet comprises the address of itself;
means for receiving said emergency packet and generating an intrusion attempt indication, in response thereto;
means for detecting a carrier signal without subsequent receipt of said emergency packet and transmitting an emergency packet request, in response thereto; and
means for resending said emergency packet in response to receipt of said emergency packet request.

29. The ASIC according to claim 28, wherein said emergency packet is transmitted within an emergency window following the end of the received packet.

30. The ASIC according to claim 28, wherein it is checked for receipt of said carrier signal during an emergency window following the end of the received packet.

31. The ASIC according to claim 28, wherein said emergency packet request is transmitted during an acknowledgement window following an emergency window.

32. The ASIC according to claim 28, further comprising means adapted to:
repeatedly transmit said emergency packet request a predefined number of times if said carrier signal is detected without receipt of an emergency packet; and
generate an intrusion attempt indication upon failure to receive said emergency packet.

33. The ASIC according to claim 32, wherein said predefined number of times equals two.

34. The ASIC according to claim 28, further comprising means for sending said received packet along with said intrusion attempt indication to a host.

35. The ASIC according to claim 28, further comprising means for determining whether said node is both a victim and destination node and if so, generating said intrusion attempt indication without transmitting said emergency packet.

36. A communications station for transmitting and receiving signals to and from other stations connected over a shared communications media based network, comprising:
   a coupling circuit for generating a receive signal received over said network and for outputting a transmit signal onto said network;
   a transmitter adapted to modulate a synchronization sequence and data to be transmitted in accordance with a modulation scheme so as to generate said transmit signal therefrom, said synchronization sequence comprising a plurality of symbols wherein each symbol is separated by a time delay in accordance with a predetermined synchronization sequence time delay template;
   a receiver adapted to demodulate said receive signal in accordance with said modulation scheme so as to generate a receive data signal therefrom;
   a media access control (MAC) circuit adapted to interface an application processor to said shared communications media, said MAC circuit comprising:
      means for determining that a received packet comprises an address corresponding to said station;
      means for transmitting an emergency packet following the end of said received packet if said station determines said received packet comprises the address of itself;
      means for receiving said emergency packet and generating an intrusion attempt indication, in response thereto;
      means for detecting a carrier signal without subsequent receipt of said emergency packet and transmitting an emergency packet request, in response thereto;
      means for resending said emergency packet in response to receipt of said emergency packet request; and
   said application processor adapted to control the operation of said transmitter, receiver and MAC and to provide an interface between said MAC and an external host.

37. The communications station according to claim 36, wherein said modulation scheme comprises code shift keying (CSK) modulation.

38. The communications station according to claim 36, wherein said emergency packet is transmitted within an emergency window following the end of the received packet.

39. The communications station according to claim 36, wherein detection of said carrier signal occurs during an emergency window following the end of the received packet.

40. The communications station according to claim 36, wherein said emergency packet request is transmitted during an acknowledgement window following an emergency window.

41. The communications station according to claim 36, further comprising:
   means for repeatedly transmitting said emergency packet request a predefined number of times if said carrier signal is detected without receipt of an emergency packet; and
   means for generating an intrusion attempt indication upon failure to receive said emergency packet.

42. The communications station according to claim 41, wherein said predefined number of times equals two.

43. The communications station according to claim 36, further comprising means for sending said received packet along with said intrusion attempt indication to a host.

44. The communications station according to claim 36, further comprising means for determining whether said station is both a victim and destination node and if so, generating said intrusion attempt indication without transmitting said emergency packet.

45. The communications station according to claim 36, wherein said MAC is implemented in an Application Specific Integrated Circuit (ASIC).

46. The communications station according to claim 36, wherein said MAC is implemented in a Field Programmable Gate Array (FPGA).

47. A computer program product for use in communications station, said computer program product comprising:
   a computer useable medium having computer readable program code means embodied in said medium for detecting intrusion attempts by an imposter in a communications network, said computer program product comprising:
   computer readable program code means for determining that a received packet comprises an address corresponding to said node;
   computer readable program code means for transmitting an emergency packet following the end of said received packet if said node determines said received packet comprises the address of itself;
   computer readable program code means for receiving said emergency packet and generating an intrusion attempt indication, in response thereto;
   computer readable program code means for detecting a carrier signal without subsequent receipt of said emergency packet and transmitting an emergency packet request, in response thereto; and
   computer readable program code means for resending said emergency packet in response to receipt of said emergency packet request.

* * * * *